United States Patent [19]
Takahashi et al.

[11] Patent Number: 5,748,496
[45] Date of Patent: May 5, 1998

[54] DIAGNOSIS SYSTEM

[75] Inventors: Fuminobu Takahashi, Katsuta; Masahiro Koike; Shunsuke Uchida, both of Hitachi; Haruo Fujimori, Hitachiota; Izumi Yamada, Ibaraki-ken; Takaharu Fukuzaki, Hitachi; Makoto Nagase, Mito, all of Japan

[73] Assignee: Hitachi, Ltd., Tokyo, Japan

[21] Appl. No.: 700,043

[22] Filed: Aug. 20, 1996

Related U.S. Application Data

[63] Continuation of Ser. No. 247,888, May 23, 1994, abandoned.

[30] Foreign Application Priority Data

Jun. 4, 1993 [JP] Japan ................................. 5-134572

[51] Int. Cl.$^6$ ................................................ G21C 7/36
[52] U.S. Cl. .................. 364/550; 364/551.01; 364/507; 73/763; 376/216; 395/912; 395/915
[58] Field of Search ........................ 364/402, 550, 364/576, 551.01, 178, 507; 73/660, 579, 583, 763; 376/216, 217; 395/912, 915, 911

[56] References Cited

U.S. PATENT DOCUMENTS

| | | | |
|---|---|---|---|
| H1006 | 12/1991 | Zwicke | 364/551.01 |
| 4,060,716 | 11/1977 | Pekrul et al. | 364/576 |
| 4,213,183 | 7/1980 | Barron et al. | 364/507 |
| 4,552,718 | 11/1985 | Impink, Jr. et al. | 376/216 |
| 4,563,746 | 1/1986 | Yoshida et al. | 395/914 |
| 4,967,337 | 10/1990 | English et al. | 364/550 |
| 5,005,142 | 4/1991 | Lipchak et al. | 364/550 |
| 5,009,833 | 4/1991 | Takeuchi et al. | 376/217 |
| 5,167,010 | 11/1992 | Elm et al. | 395/915 |
| 5,247,433 | 9/1993 | Kitaura et al. | 376/216 |
| 5,271,045 | 12/1993 | Scarola et al. | 376/216 |
| 5,315,502 | 5/1994 | Koyama et al. | 364/184 |
| 5,357,425 | 10/1994 | Minto | 364/178 |
| 5,365,787 | 11/1994 | Hernandez et al. | 73/660 |

*Primary Examiner*—James P. Trammell
*Assistant Examiner*—Eric W. Stamber
*Attorney, Agent, or Firm*—Antonelli, Terry, Stout, & Kraus, LLP

[57] ABSTRACT

A diagnosis system having sensors for supervising a plant, signal processors for processing signals of the sensors, and a state quantity arithmetic operation unit. The state quantity arithmetic operation unit calculates a quantity of state expressing the environment of the plant on the basis of supervisory information inputted through the signal processors. A state quantity prediction unit predictively calculates a quantity of state after a predetermined time on the basis of the quantity of state, supervisory information and a time change of the quantity of state inputted through the state quantity arithmetic operation unit. A future event prediction unit predicts a future event on the basis of predicted information of the quantity of state inputted through the state quantity prediction unit. An image information processor converts the quantity of state given by the state quantity arithmetic operation unit into image information and indicates the image information on a display unit. An image information processor converts the predicted quantity of state after the predetermined time, given by the state quantity prediction unit, into image information and indicates the image information on a display unit. An image information processor converts the future event predicted by the future event prediction unit into image information and indicates the image information on a display unit.

17 Claims, 14 Drawing Sheets

DIAGNOSIS SYSTEM

This application is a continuation application of Ser. No. 08/247,888, filed May 23, 1994, now abandoned.

BACKGROUND OF THE INVENTION

The present invention relates to a diagnosis system and particularly to a diagnosis system adapted for plant supervisory diagnosis and nondestructive inspection and diagnosis.

In a conventional plant, operators are informed of the operating conditions of the plant by the switching on and off of lamps, the display of indication values of gauges, the indication of computer-processed data on a display or the indication of composite data thereof in accordance with systems of respective apparatuses which are constituent members of the plant. Accordingly, the operators judge the operating/environmental conditions of the plant synthetically through their knowledge/experience on the basis of these data. In the case where the operating/environmental conditions of the plant are supervised through an image, the object of the image is limited to a place which can be observed directly by the eyes or a place which can be observed indirectly through an image pickup device.

In conventional nondestructive inspection and diagnosis, internal defects of structural materials or apparatuses in the plant are detected and pictorially displayed by an X-ray computer tomography (CT) apparatus, an ultrasonic flaw detector or the like. As a conventional technique relating to the plant supervising apparatus, JP-A No. 59-212796 discloses a supervising apparatus in which physical quantities such as in-furnace pressure, fed water flow rate, and so on are supplied and standardized so that standard values of the physical quantities after a required time are estimated on the basis of the past standard values and the current standard values and a current standard pattern and a standard pattern after the required time are displayed at the same time.

Further, JP-A No. 60-191389 discloses a supervising apparatus in which a plurality of display units are provided so that state signals obtained from various measurement signals and expressing the operating condition of a plant are displayed as specific images on the respective display units, and in which when an abnormality is detected on the basis of the respective measurement signals, an image relating to a system of the abnormality is displayed on one of the display units selected in accordance with the kind of the abnormality.

In the aforementioned plant supervisory diagnosis, it is necessary that the recognition of state in an unobservable place of the plant and the recognition of a future event which will be caused by a transition of the environmental state of the plant depend on the operator's rich experience/knowledge and deep insight.

In nondestructive inspection and diagnosis, it is difficult that an inspector predicts how important the presence of the detected defect is or what a repercussion event will be caused by the growth of the defect in the future.

SUMMARY OF THE INVENTION

A first object of the present invention is to provide a plant supervisory diagnosis system in which an operator not having rich experience/knowledge can perform supervisory diagnosis for a plant accurately.

A second object of the present invention is to provide a nondestructive inspection and diagnosis system in which an inspector can easily recognize the importance of a defect generated in an object of inspection.

The first object of the present invention is achieved by a plant supervisory diagnosis system in which: a current quantity of environmental state is obtained on the basis of plant supervisory information; a quantity of state after a predetermined time is predicted on the basis of the current quantity of state; and a future event such as production of a void is inferred on the basis of the quantity of state after the predetermined time and displayed.

The first object of the present invention is also achieved by a plant supervisory diagnosis system in which: a current quantity of environmental state is obtained on the basis of plant supervisory information; a quantity of state after a predetermined time is predicted on the basis of the current quantity of state; and a repercussion event which will be caused by a transition of the current quantity of state is inferred on the basis of comparison between the predicted quantity of state and the durability of a structural material or apparatus in a plant and displayed.

The first object of the present invention is further achieved by a plant supervisory diagnosis system in which: a quantity of environmental state after a predetermined time is predicted on the basis of plant supervisory information, so that a future event such as production of a void is inferred on the basis of the quantity of state after the predetermined time and displayed; and a change of the quantity of state in accordance with an assumed manipulated variable is predicted, so that a future event which will be caused by the change of the quantity of state is inferred and displayed.

The second object of the present invention is achieved by a nondestructive inspection and diagnosis system for detecting a defect in a structural material or apparatus in a plant and for measuring the position and size of the defect, in which: a current state of the defect is displayed; the progress of the defect is predicted to thereby display a state of the defect after a predetermined time.

The second object of the present invention is also achieved by a nondestructive inspection and diagnosis system for detecting a defect in a structural material or apparatus in a plant and for measuring the position and size of the defect, in which: the progress of the defect is predicted to thereby obtain a state of the defect after a predetermined time; and a repercussion event which will be caused by the progress of the defect is inferred on the basis of comparison between a result of the prediction and the durability of the structural material or apparatus in the plant and displayed.

According to the present invention, a current quantity of environmental state is obtained on the basis of plant supervisory information; a quantity of state after a predetermined time is predicted on the basis of the current quantity of state; and a future event such as production of a void is inferred on the basis of the quantity of state after the predetermined time and displayed. Accordingly, a future event which will be caused by a transition of the current environmental state of the plant can be made to be recognized by an operator visually, so that the operator can diagnose the environmental state and repercussion event of the plant easily even in the case where the operator does not have rich experience/knowledge.

Further, a current quantity of environmental state is obtained on the basis of plant supervisory information; a quantity of state after a predetermined time is predicted on the basis of the current quantity of state; and a repercussion event which will be caused by a transition of the current quantity of state is inferred on the basis of a comparison between the predicted quantity of state and the durability of a structural material or apparatus in a plant and the event is displayed. It is possible to make an operator visually recognize a repercussion event which will be newly generated so that even an operator who has no rich experience and knowledge can easily supervise and diagnose the environmental state and repercussion event of plant.

Further, a quantity of environmental state after a predetermined time is predicted on the basis of plant supervisory information; a future event such as generation of a void or the like is inferred on the basis of the quantity of state after the predetermined time and the event is displayed; a change of the quantity of state relative to an assumed variable of manipulation is predicted; and a future event which will be generated on the basis of the change of the quantity of state is inferred and the event is displayed. Accordingly, it is possible to make an operator visually recognize a future event which will be caused by a transition of the current environmental state of the plant and a future event which will be generated in accordance with the assumed variable of manipulation, so that even an operator who has no rich experience and knowledge can supervise and diagnose the environmental state and future event of the plant easily and can take measures properly.

Further, a current state of a defect generated in a structural material or apparatus in a plant is displayed; the progress of the defect is predicted to thereby display a state of the defect after a predetermined time. Accordingly, the state of future progress of the defect can be made to be recognized by an inspector visually, so that the inspector can recognize the importance of the defect easily.

Further, the progress of a defect generated in a structural material or apparatus in a plant is predicted to thereby obtain a state of the defect after a predetermined time; and a repercussion event; which will be caused by the progress of the defect is inferred on the basis of comparison between a result of the prediction and the durability of the structural material or apparatus in the plant and displayed. Accordingly, a repercussion event which will be caused by the defect in the future can be made to be recognized by an inspector visually, so that the inspector can recognize the importance of the defect easily.

In this specification, abnormality of the plant, such as leaking of gas/fluid, destruction of a container, breaking of a piping/nozzle, and so on, are generically called "repercussion event", and these repercussion events and unobservable abnormality of the plant such as production of a void, expansion of a container, and so on, are generically called "future events".

DESCRIPTION OF THE PREFERRED EMBODIMENTS

Figure 1:
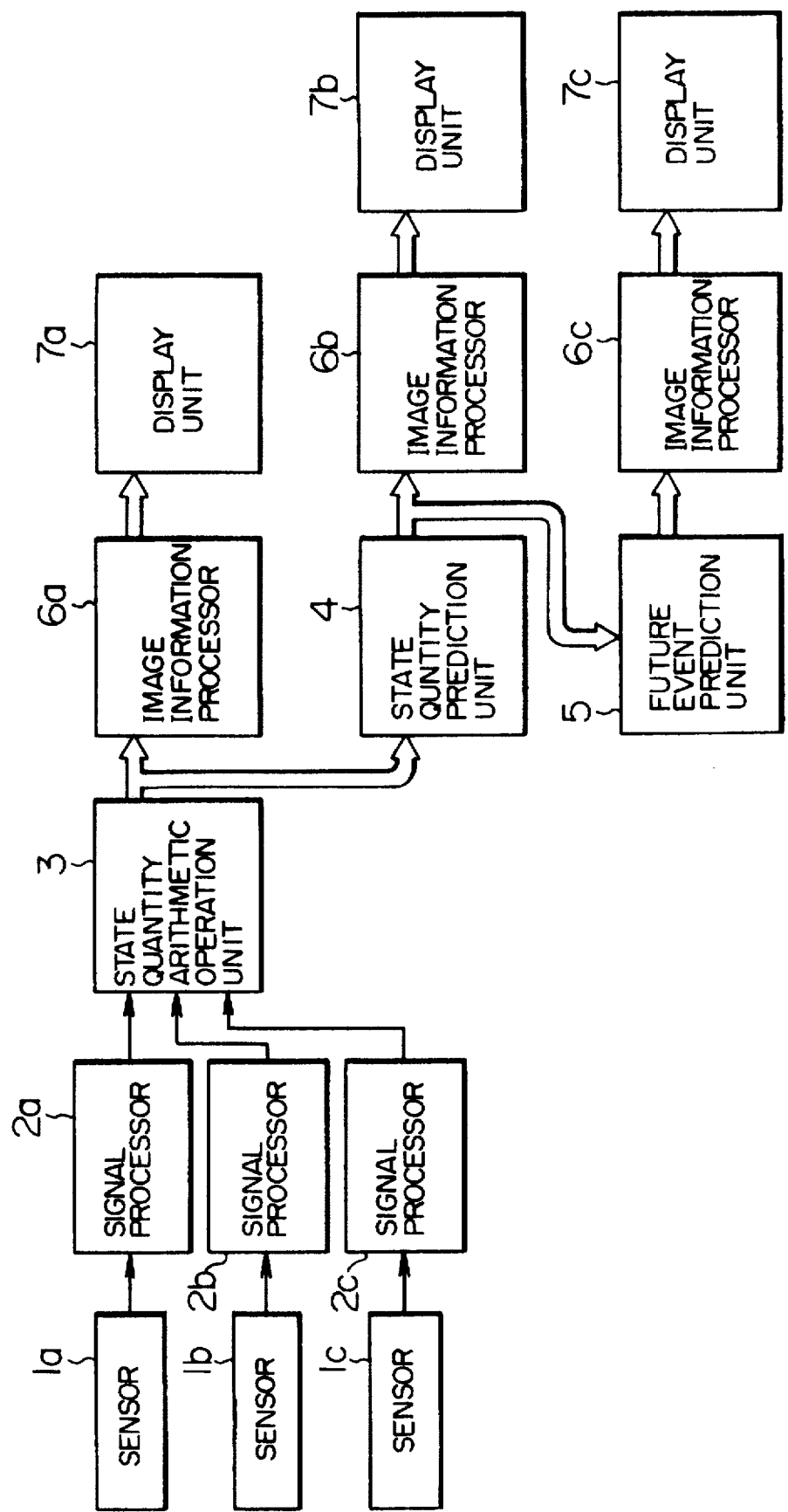
FIG. 1 is a diagram showing a first embodiment of the prevent invention adapted to a plant supervisory diagnosis system.

Embodiments of the present invention will be described below with reference to the drawings. FIG. 1 shows a first embodiment of the present invention adapted to a plant supervisory diagnosis system. In the drawing, the reference numerals 1a, 1b and 1c designate sensors for supervising a plant and 2a, 2b and 2c signal processors for processing signals of the sensors. A state quantity arithmetic operation unit 3 calculates a quantity of state expressing the environment of the plant on the basis of supervisory information such as temperature, pressure, and so on, given by the signal processors 2a, 2b and 2c and stores the supervisory information and the time change of the quantity of state if necessary. A state quantity prediction unit 4 predictively calculates a quantity of state after a predetermined time on the basis of the quantity of state, the supervisory information and the time change of the quantity of state inputted through the state quantity arithmetic operation unit 3. A future event prediction unit 5 predicts a future event on the basis of the predicted information of the quantity of state given by the state quantity prediction unit 4. An image information processor 6a converts the quantity of state given by the state quantity arithmetic operation unit 3 into image information and indicates the image information on a display unit 7a. An image information processor 6b converts the predicted quantity of state after the predetermined time, given by the state quantity prediction unit 4, into image information and indicates the image information on a display unit 7b. An image information processor 6c converts the future event predicted by the future event prediction unit 5 into image information and indicates the image information on a display unit 7c.

Figure 2:
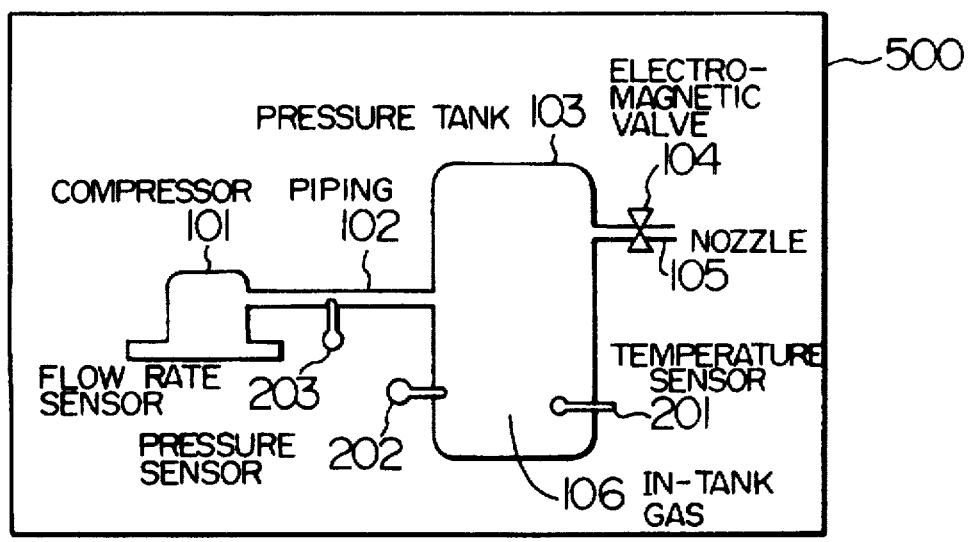
FIG. 2 is a diagram showing an example of image display on the display unit depicted in FIG. 1.

FIG. 2 shows an example of image display on the display unit 7a in the case where the system depicted in FIG. 1 is applied to a pressure plant. In FIG. 2, an image expressing the environmental state of the pressure plant composed of a compressor 101, a piping 102, a pressure tank 103, an electromagnetic valve 104, a nozzle 105, an in-tank gas 106, a temperature sensor 201, an in-tank pressure sensor 202 and a piping flow rate sensor 203 is indicated on a screen 500 of the display unit 7a. Assuming now that the pressure or temperature of the in-tank gas 106 is set as the quantity of environmental state, then an image of the gas is expressed in predetermined luminance or hue proportional to supervisory information of the pressure sensor 202 or temperature sensor 201.

Figure 3:
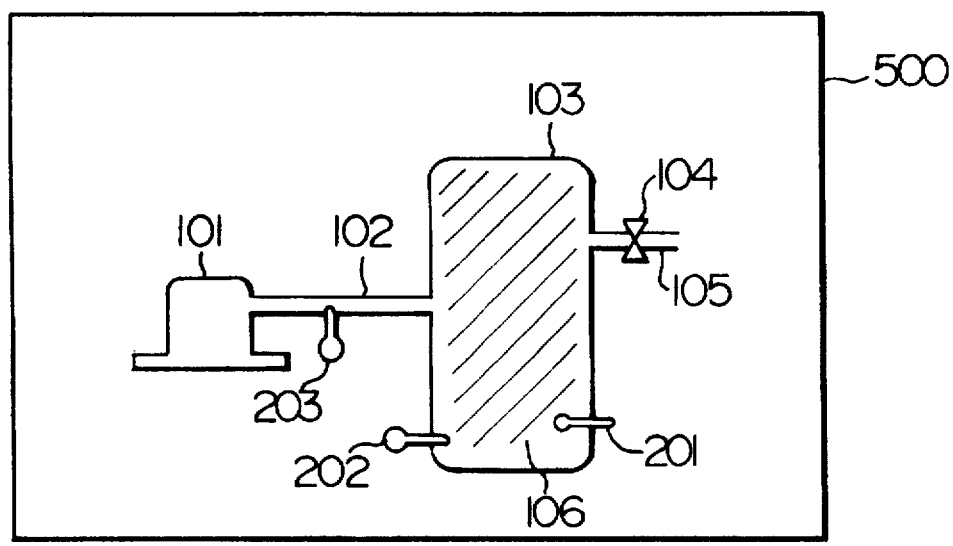
FIG. 3 is a diagram showing an example of image display on the display unit depicted in FIG. 1.

FIG. 3 shows an example of image display on the display unit 7b in the case where the system depicted in FIG. 1 is applied to a pressure plant. The image shown in FIG. 3 has the same structure as the image shown in FIG. 2 but the image shown in FIG. 3 is an image obtained by predicting the quantity of state after a predetermined time in FIG. 2. In FIG. 3, the prediction of the quantity of state by the state quantity prediction unit 4 is performed on the basis of the following arithmetic operation.

Let $v_0$ be a flow rate which is supervisory information of the flow rate sensor 203 at the present point of time. Let $T_0$ be a temperature which is supervisory information of the temperature sensor 201 at the present point of time. Let $P_0$ be a pressure which is supervisory information of the pressure sensor 202 at the present point of time. When, for example, the system is operated while the flow rate $v_0$ is kept constant, pressure Pt and temperature Tt after a predetermined time t can be obtained on the basis of the expressions 1 and 2:

$$Pt = (1 + S \cdot v_0 \cdot t/V) \cdot (P_0 + R \cdot (Tt - T_0)) \qquad \text{Expression 1}$$

$$(Tt - T_0) = (Pt - P_0) \cdot V/R \qquad \text{Expression 2}$$

in which S represents the sectional area of the piping 102, V represents the volume of the pressure tank 103 and R represents a gas constant. After Pt and Tt are obtained on the basis of the expressions 1 and 2, images in accordance with the predicted values Pt and Tt of the quantity of state of the in-tank gas 106 are expressed as shown in FIG. 3 in luminance or hue different from the luminance or hue in FIG. 2.

In the case where the flow rate $v_0$ is not kept constant, for example, v(t) obtained by fitting the trend of the flow rate v up to the present point of time to a spline function with time t as a parameter is employed as the predicted value of the flow rate. In this case, $v_0 \cdot t$ in the expression 1 is replaced as represented by the following expression.

$$V_0 \cdot t = \int_0^t \{v(t)\} dt \qquad \text{Expression 3}$$

Figure 4:
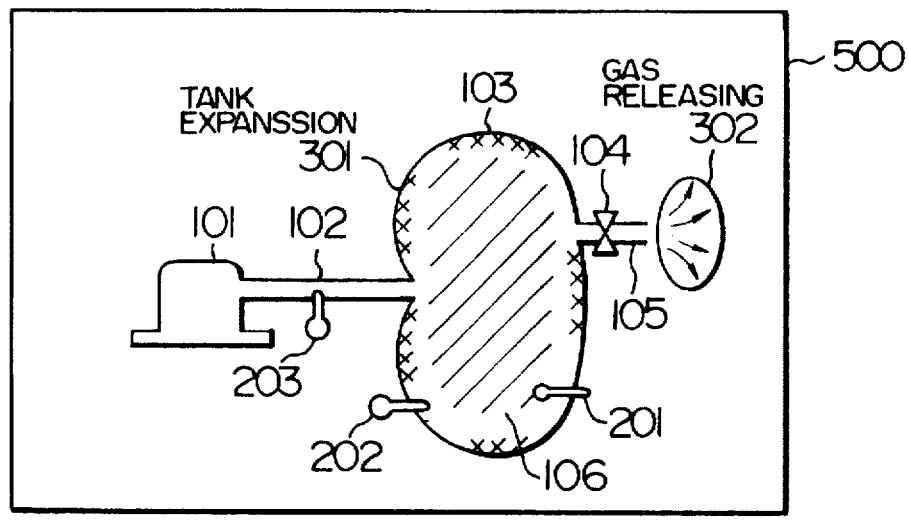
FIG. 4 is a diagram showing an example of image display in the case where the system depicted in FIG. 1 is applied to a pressure plant.

FIG. 4 shows an example of image display on the display unit 7c in the case where the system depicted in FIG. 1 is applied to a pressure plant. FIG. 4 is different from FIGS. 2 and 3 in that a repercussion event which is a future event such as expansion 301 of the pressure tank 103 or gas releasing 302 from the nozzle 105 is expressed in the form of an image. The event display is not limited to such image display but character display or lamp display may be employed as the event display.

In this occasion, the prediction of the repercussion event in the future event prediction unit 5 is performed in the following procedure. For example, let temperature Tt and pressure Pt be values of the quantity of state after the predetermined time t as predicted by the state quantity prediction unit 4. In the future event prediction unit 5, the proof pressure Pd against deformation, of the pressure tank 103 and the pressure Ps required for starting the electromagnetic valve 104 are compared with the pressure Pt, so that a repercussion event is predicted in accordance with the following expression.

if Pt>Pd, then the pressure tank 103 is expanded.

if Pt≦Pd, then the pressure tank 103 is not expanded.

if Pt≧Ps, then the electromagnetic valve 104 is operated so that gas is released from the nozzle 105.

if Pt<Ps, then the electromagnetic valve 104 is not operated.     Expression 4

Figure 5:
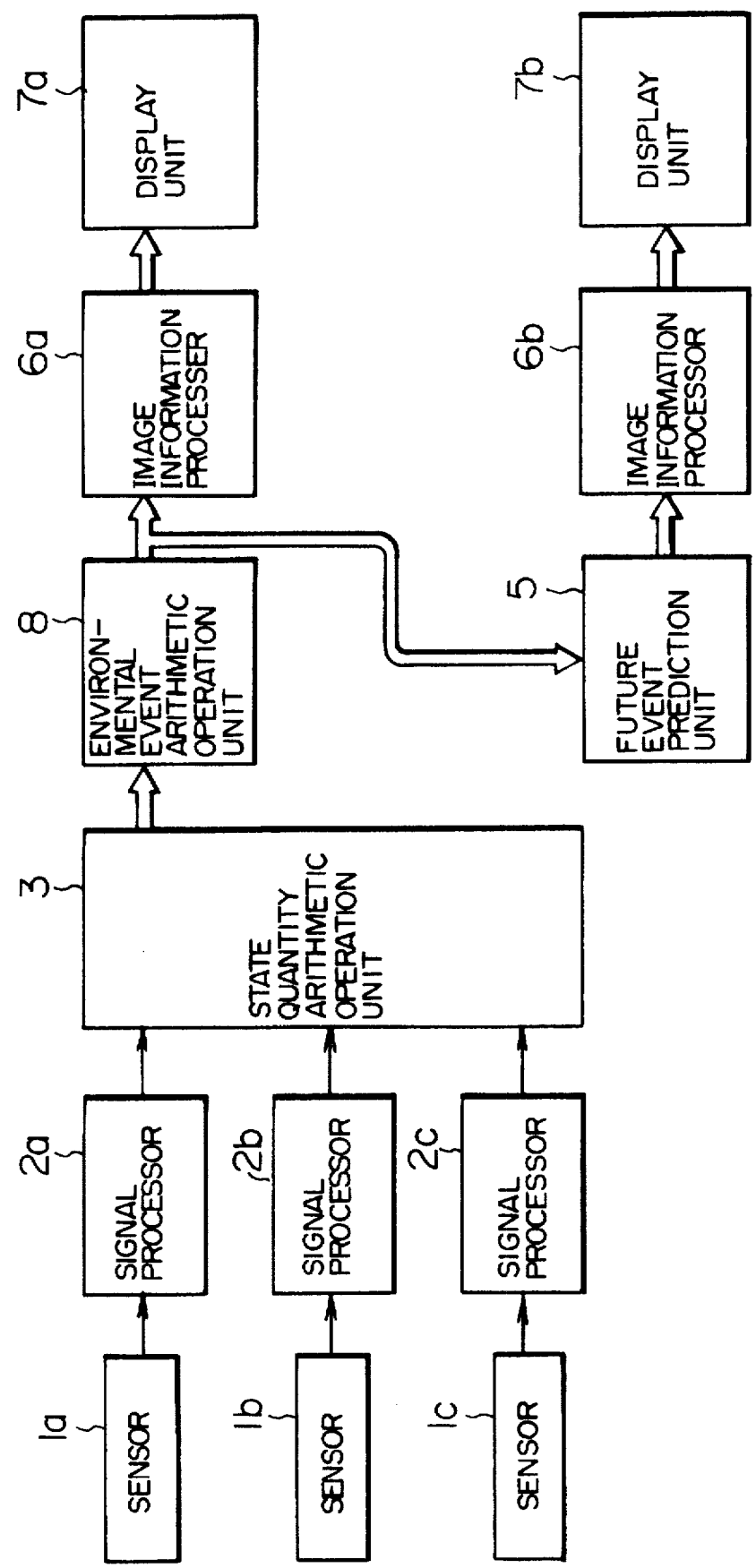
FIG. 5 is a diagram showing a second embodiment of the present invention adapted to a plant supervisory diagnosis system.

Referring to FIG. 5, a second embodiment of the present invention adapted to a plant supervisory diagnosis system will be described below. In the drawing, the reference numerals 1a, 1b and 1c designate sensors for supervising a plant and 2a, 2b and 2c signal processors for processing signals of the sensors. A state quantity arithmetic operation unit 3 calculates a quantity of state expressing the environment of the plant on the basis of supervisory information given by the signal processors 2a, 2b and 2c and stores the supervisory information and the time change of the quantity of state if necessary. An environmental event arithmetic operation unit 8 infers an unobservable quantity of environmental state and an unobservable event on the basis of the quantity of state, the supervisory information and the time change of the quantity of state inputted through the state quantity arithmetic operation unit 3 and stores the time change thereof. The inferred results are delivered to an image information processor 6a and a future event prediction unit 5, respectively. The future event prediction unit 5 predicts a quantity of state and a future event after a predetermined time on the basis of the quantity of state, the supervisory information and the time change of the quantity of state from the point of time before the predetermined time to the present point of time, as inputted through the environmental event arithmetic operation unit 8. The image information processor 6a converts the quantity of state given by the environmental event arithmetic operation unit 8 into image information and indicates the image information on a display unit 7a. An image information processor 6b converts the quantity of state and the future event inputted through the future event prediction unit 5 into image information and indicates the image information on a display unit 7b.

Figure 6:
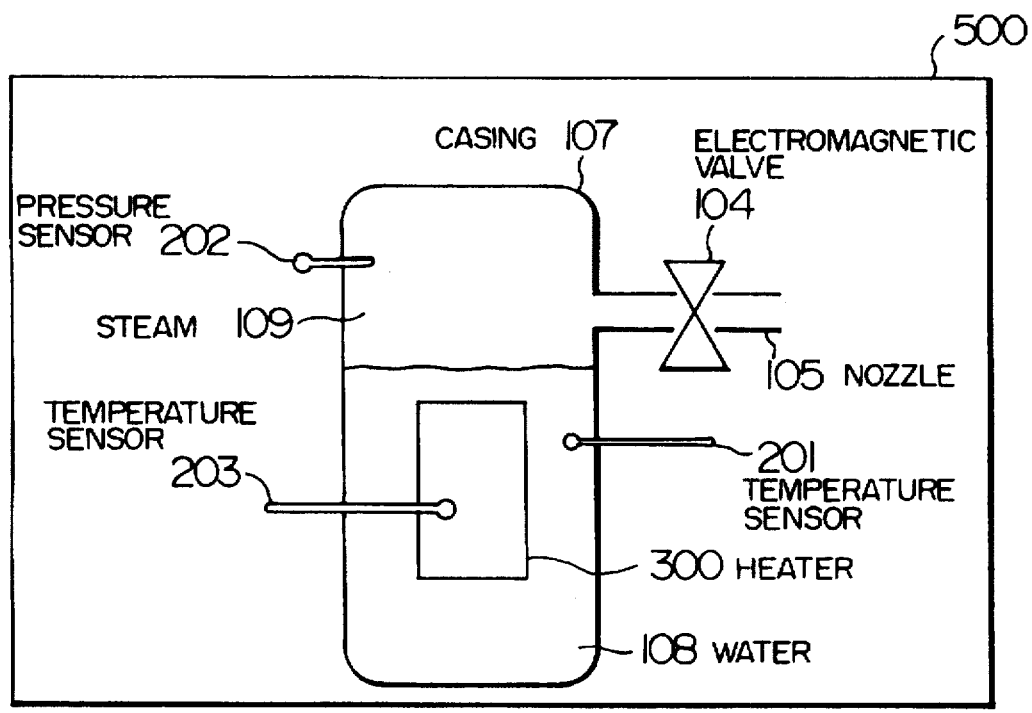
FIG. 6 is a diagram showing an example of image display in the case where the system depicted in FIG. 5 is applied to a container to be heated and boiled.
Figure 7:
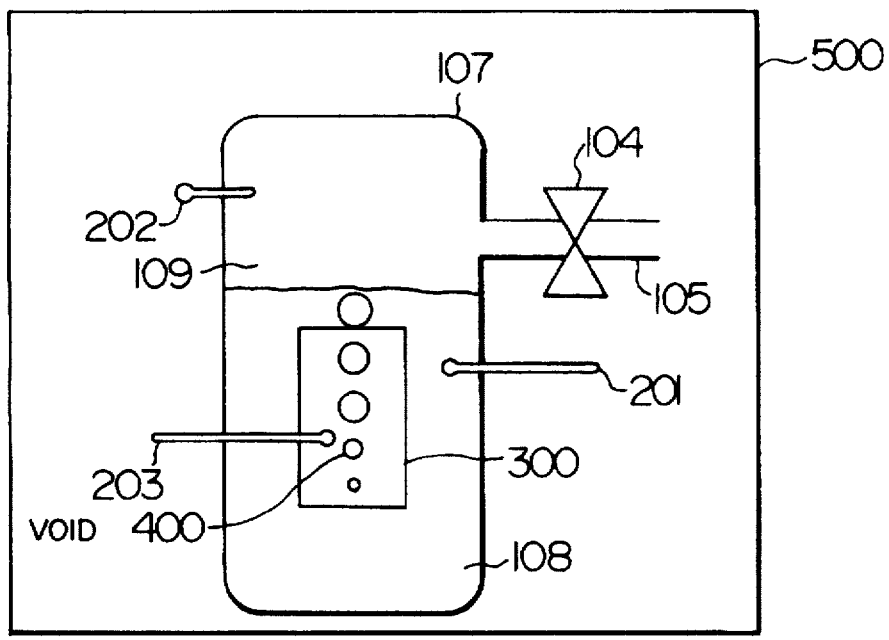
FIG. 7 is a diagram showing the case where the state of voids is indicated in the image depicted in FIG. 6.

FIG. 6 shows the case where the system depicted in FIG. 5 is applied to a container to be heated and boiled. FIG. 6 is a diagram showing a heat and boil container which is constituted by a casing 107, a heater 300, an electromagnetic valve 104, a nozzle 105, steam 109 and water 108 in the casing, temperature sensors 201 and 203, and a steam pressure sensor 202. Although the boiling state of water in the casing cannot be grasped directly by the sensors set in the casing, control of the inside of the heat and boil container is made easier if the state can be recognized. In the system depicted in FIG. 5, therefore, an image of voids 400 representing the boiling state of water in the casing as shown in FIG. 7 is changed by using predetermined luminance or hue or indicated in the form of an animation image in accordance with supervisory information of the pressure sensor 202 and temperature sensors 201 and 203.

In this occasion, the inference of an environmental event in the environmental event arithmetic operation unit 8 in FIG. 5 is performed on the basis of the following arithmetic operation. Assuming now that pressure which is supervisory information of the pressure sensor 202 and temperatures which are supervisory information of the temperature sensors 201 and 203 at the present point of time are represented by $P_0$, $Tw_0$ and $Tm_0$ respectively, then void generation rate D is given by the following expression:

$$D = \alpha(Tm_0 - Tw_0)/P_0 - Fr(P_0, Tc-Tw_0) \qquad \text{Expression 5}$$

in which α represents a coefficient expressing the heat flow rate from the heater 300 to the water 108, Tc represents a critical temperature, and Fr represents the condensation rate in temperature difference (Tc-$Tw_0$) and pressure $P_0$. In proportion to or in accordance with the void generation quantity D obtained on the basis of the expression 5, the luminance or hue of voids 400 in FIG. 7 may be changed or the ascending speed of voids 400 may be heightened or the size of voids may be changed. Alternatively, these may be combined so that an animation image is indicated on the display unit 7a by the image information processor 6a.

In the future event prediction unit 5 in FIG. 5, for example, the pressure Pp of the casing 107 after a predetermined time t is predicted by using the following expression:

$$Pp = P_0(V-Vw+Ds)/(V-Vw) \qquad \text{Expression 6}$$

in which Ds represents the total quantity of voids generated for the predetermined time t in the case where the heating value of the heater 300 is constant, V represents the volume of the casing 107, and Vw represents the volume of water 108. In the case where the heating value of the heater 300 varies, Ds is obtained as represented by the following expression by using D in the expression 5.

$$Ds = \int_0^t \{D(t)\}dt \qquad \text{Expression 7}$$

Then, on the basis of comparison between the pressure Pp and the starting pressure Pe of the electromagnetic valve 104, a repercussion event is predicted in accordance with the following expression.

if Pp≧Pe, then the electromagnetic valve 104 is operated to thereby release steam from the nozzle 105 so that the steam pressure Pp increases.

if Pp<Pe, then the electromagnetic valve 104 is not operated so that the steam pressure Pp increases. Expression 8

Figure 8:
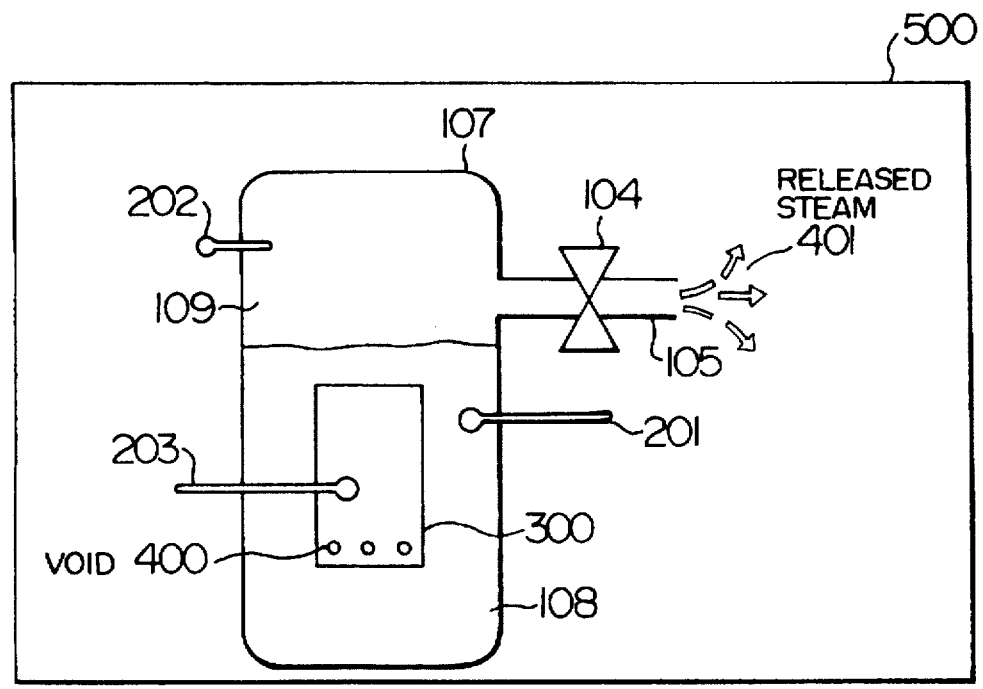
FIG. 8 is a diagram showing the case where the repercussion event of steam leaking is indicated in the image depicted in FIG. 6.

On the basis of the repercussion event thus predicted, for example, the repercussion event in which steam is released from the nozzle 105 so that the steam pressure Pp decreases as shown in FIG. 8 is indicated on the display unit 7b by the image information processor 6b in FIG. 5. In this occasion, the released steam 401 may be indicated in the form of an animation image. Further, the decrease of the steam pressure Pp may be indicated by the change of luminance or hue or may be indicated in the form of an animation image expressing the contraction of the casing 107.

Figure 9:
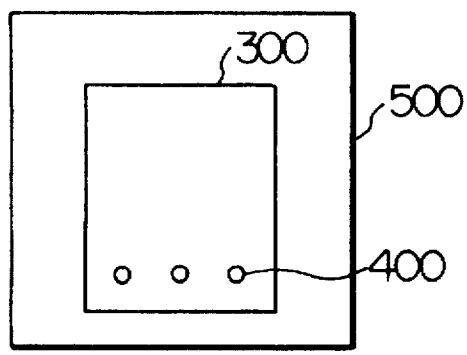
FIG. 9 is a diagram showing the case where an animation image of voids is indicated in the image depicted in FIG. 6.
Figure 12:
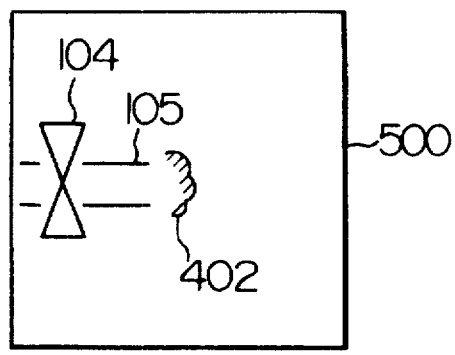
FIG. 12 is a diagram showing the case where an animation image of steam leaking is indicated in the image depicted in FIG. 6.
Figure 10:
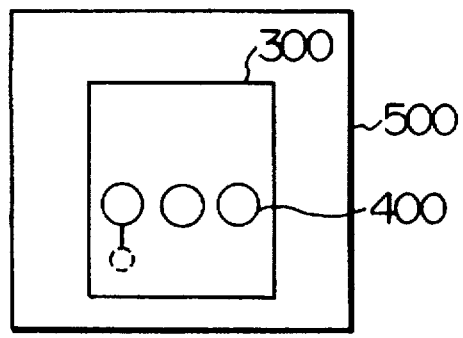
FIG. 10 is a diagram showing the case where an animation image of voids is indicated in the image depicted in FIG. 6.
Figure 13:
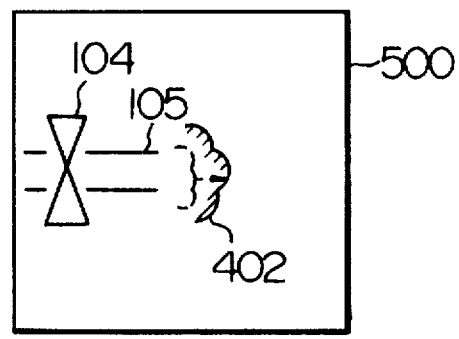
FIG. 13 is a diagram showing the case where an animation image of steam leaking is indicated in the image depicted in FIG. 6.
Figure 11:
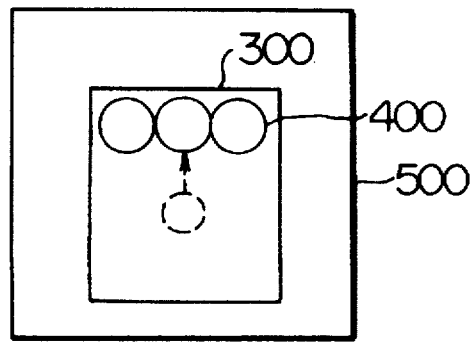
FIG. 11 is a diagram showing the case where an animation image of voids is indicated in the image depicted in FIG. 6.
Figure 14:
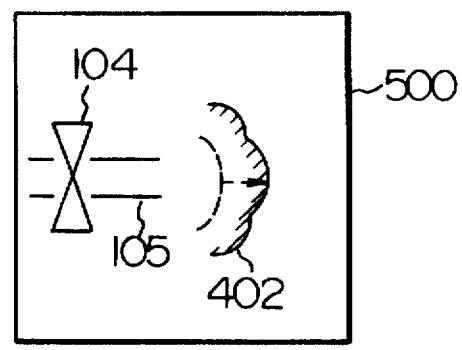
FIG. 14 is a diagram showing the case where an animation image of steam leaking is indicated in the image depicted in FIG. 6.

Next, a third embodiment of the present invention adapted to a plant supervisory diagnosis system will be described. Voids 400 shown in FIG. 7, released steam 401 shown in FIG. 8, and so on, are unobservable future events because it is difficult to grasp the actual shape thereof. In the third embodiment, therefore, these future events are indicated in the form of a typical animation image which can be understood easily by the operator. For example, in the case of voids 400, as shown in FIGS. 9, 10 and 11, the successive ascending of voids and the increase of void size in accordance with the ascending of voids are repeatedly indicated in the form of an animation image. In the case of released steam 401, as shown in FIGS. 12, 13 and 14, the situation in which the steam surface 402 of the released steam propagates and diffuses forward successively from the position at the previous point of time as represented by the broken line is repeatedly indicated so that the releasing event of released steam 401 is typically expressed in an animation image. In this occasion, the animation image is not merely repeatedly displayed but the period of repetition of the animation image may be changed in accordance with the quantity D of generation of voids per unit time in the case of FIGS. 9 to 11 or in accordance with the steam pressure Pp in the case of FIGS. 12 to 14. Further, in the case of FIGS. 9 to 11, the void size of voids 400 may be changed in accordance with the quantity D of generation of voids per unit time.

Figure 15:
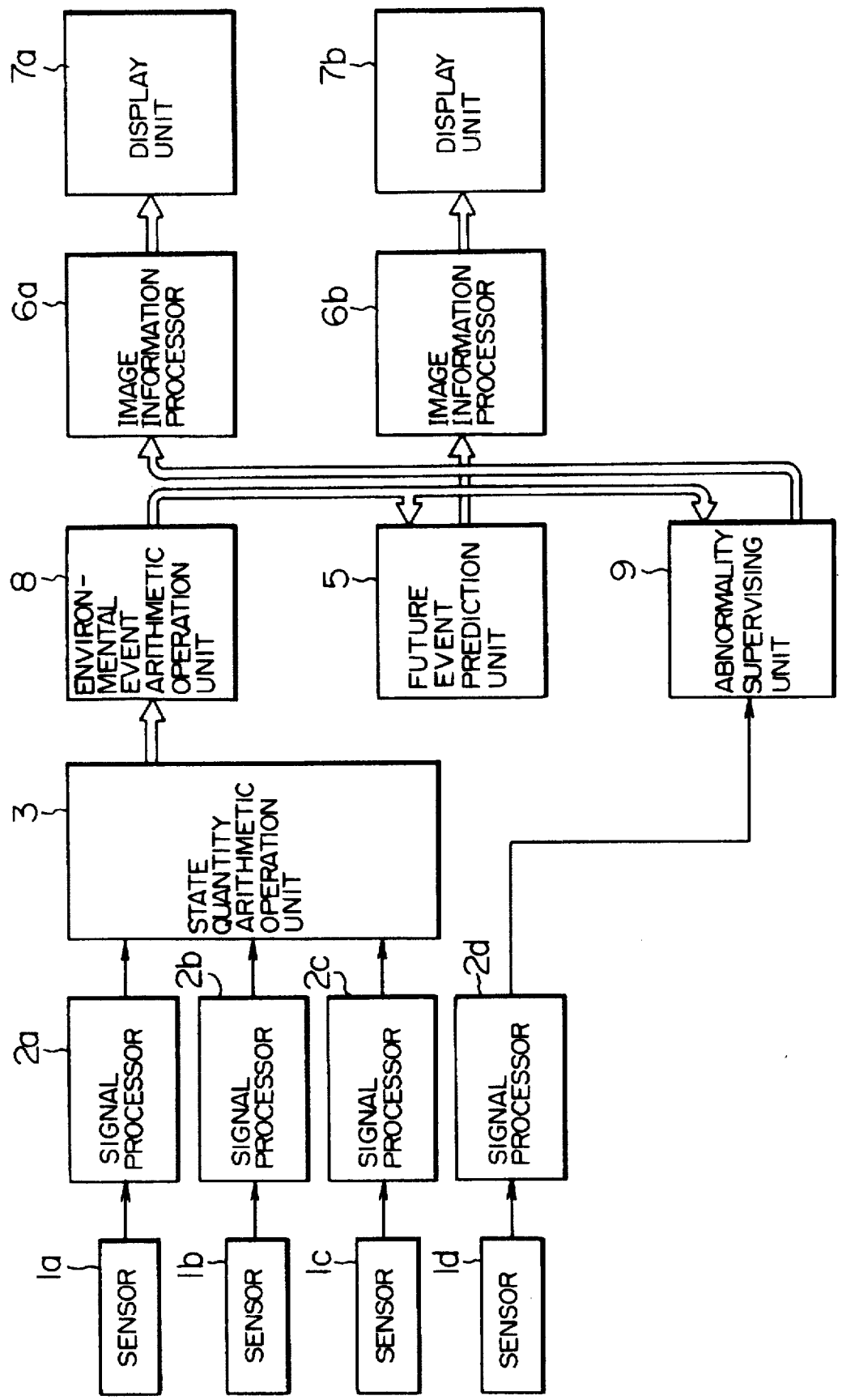
FIG. 15 is a diagram showing a fourth embodiment of the present invention adapted to a plant supervisory diagnosis system.

Referring to FIG. 15, a fourth embodiment of the present invention adapted to a plant supervisory diagnosis system will be described below. In the drawing, the reference numerals 1a, 1b and 1c designate sensors for supervising a plant and 2a, 2b and 2c signal processors for processing signals of the sensors. A state quantity arithmetic operation unit 3 calculates a quantity of state expressing the environment of the plant on the basis of supervisory information given by the signal processors 2a, 2b and 2c and stores the supervisory information and the time change of the quantity of state if necessary. An environmental event arithmetic operation unit 8 performs an arithmetic operation to obtain an unobservable quantity of environmental state and an unobservable event on the basis of the quantity of state, the supervisory information and the time change of the quantity of state inputted through the state quantity arithmetic, operation unit 3 and stores the time change thereof. The results of the arithmetic operation are delivered to an abnormality supervising unit 9 and a future event prediction unit 5, respectively. The abnormality supervising unit 9 receives information of a sensor 1d through a signal processor 2d, detects the abnormality of the sensor and signal processor on the basis of the information of the sensor 1d and the information inputted through the environmental event arithmetic operation unit 8 and delivers the information relative to abnormality and the information of the environmental event arithmetic operation unit 8 to an image information processor 6a. The future event prediction unit 5 predicts a quantity of state and a future event after a predetermined time on the basis of the quantity of state, the supervisory information and the time change of the quantity of state from the point of time before the predetermined time to the present point of time, as inputted through the environmental event arithmetic operation unit 8. The image information processor 6a converts the quantity of state given by the abnormality supervising unit 9 into image information and indicates the image information on a display unit 7a. An image information processor 6b converts the quantity of state and the future event inputted through the future event prediction unit 5 into image information and indicates the image information on a display unit 7b.

Figure 16:
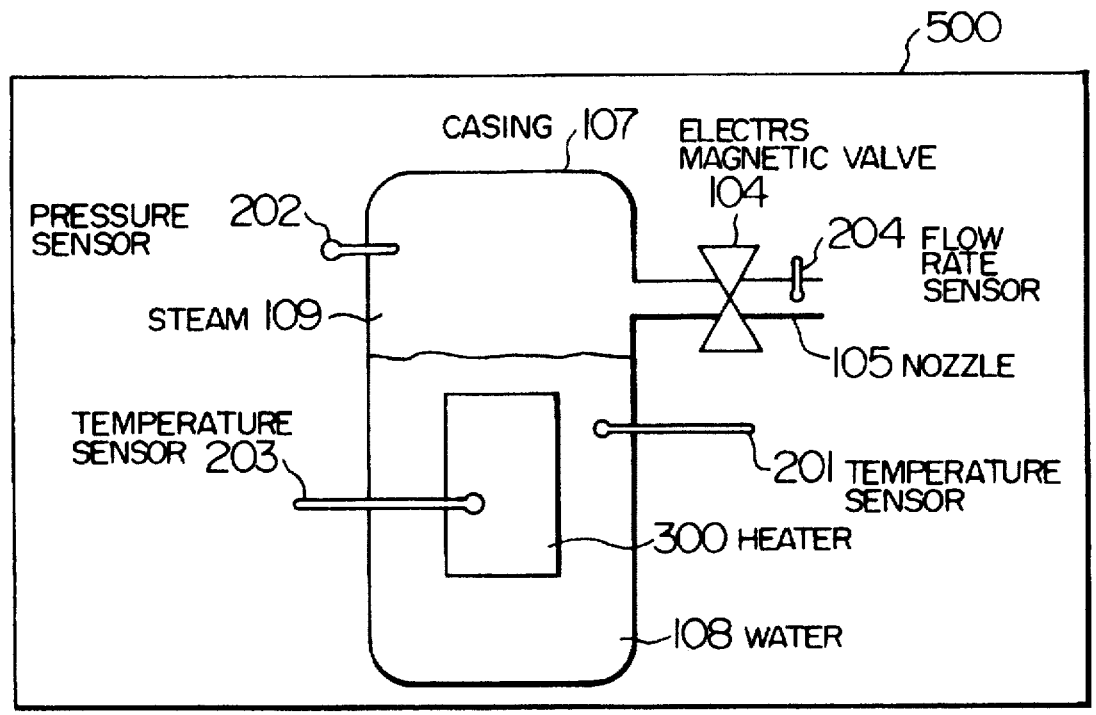
FIG. 16 is a diagram showing an example of image display in the case where the system depicted in FIG. 15 is applied to a container to be heated and boiled.

FIG. 16 shows the case where the system depicted in FIG. 15 is applied to a container to be heated and boiled. The heat and boil container is constituted by a casing 107, a heater 300, an electromagnetic valve 104, a nozzle 105, steam 109 and water 108 in the casing, temperature sensors 201 and 203, a steam pressure sensor 202, and a flow rate sensor 204. The sensor 1d in FIG. 15 corresponds to the flow rate sensor 204 in FIG. 16. The case where abnormality of the respective sensors 201, 202 and 203 in FIG. 16 is supervised by the system shown in FIG. 15 will be described below.

When, for example, the flow rate per unit time indicated by the sensor 1d, that is, the flow rate sensor 204 is M, the following relation holds between pressure $P_0$ and temperatures $Tw_0$ and $Tm_0$ which are supervisory information of the pressure sensor 202 and temperature sensors 201 and 203.

$$D = \alpha(Tm_0 - Tw_0)/P_0 - Fr(P_0, Tc - Tw_0) + M \quad \text{Expression 9}$$

Figure 17:
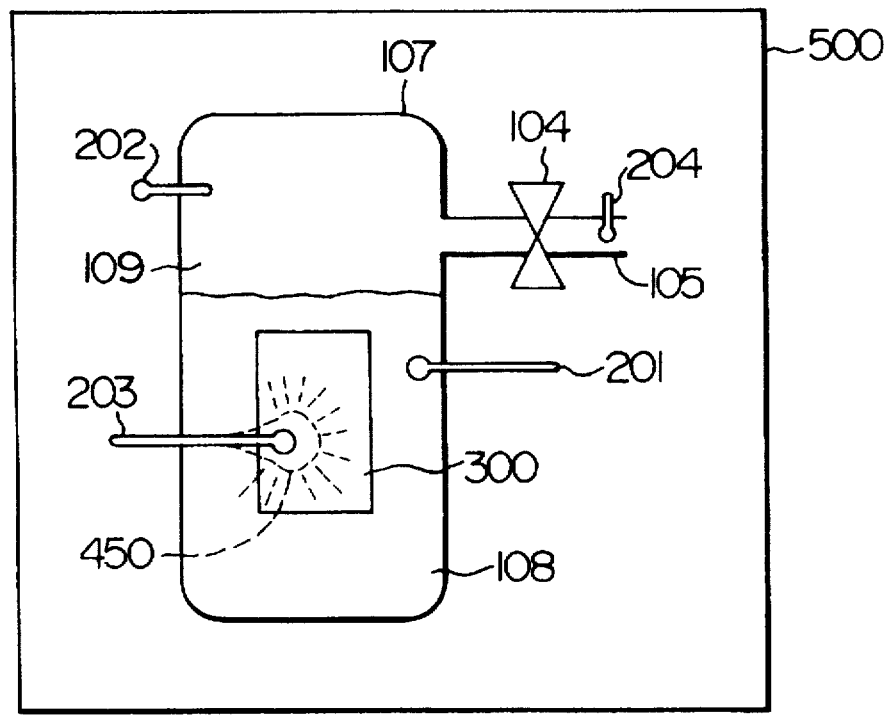
FIG. 17 is a diagram showing the case where an abnormal state of a sensor is indicated in the image depicted in FIG. 16.

Assuming now that the relation of the expression 9 does not hold between supervisory data $P_0$, $Tw_0$ and $Tm_0$ but the expression 9 holds when $Tm_0$ is replaced by $Tm_0 + \Delta T$ and that there is no change of information except $Tm_0$, then information of temperature $Tm_0$ is judged to be bad, that is, the temperature sensor 203 is judged to be abnormal. In this case, the display unit 7a indicates abnormality of the temperature sensor 203 by the change 450 of a sensor image as represented by the broken line portion in FIG. 17. As the change 450 of the sensor image, the change of size, luminance or hue of the image may be used or combination thereof or an animation image may be displayed. Alternatively, character display, lamp display, and so on, may be used. Next, a fifth embodiment of the present invention in which the abnormality supervising unit 9 in the system depicted in FIG. 15 depicted performs abnormality supervision inclusive of information of the future event prediction unit 5 will be described. In the future event prediction unit 5, for example, pressure Pp of the casing 107 after a predetermined time t is predicted. The pressure Pp is obtained on the basis of the expression 6. Assume now that the heating value of the heater 300 is kept constant and that the flow rate $M_0$ per unit time indicated by the sensor 1d, that is, the flow rate sensor 204, is predicted to change to Mp after a predetermined time t when the volume of the casing 107 and the volume of water 108 are V and Vm respectively. Then, the relation of the following expression holds between the total quantity Ds of voids generated for the predetermined time t and the flow rate.

$$Ds = \int_{M_0}^{Mp} \{M(t)\} dt \quad \text{Expression 10}$$

In the case where the equality of the expression 10 does not hold, an abnormal event is predicted in accordance with the following expression.

if $$Ds > \int_{M_0}^{Mp} \{M(t)\} dt,$$

then the pressure of the inside of the casing increases and the flow rate increases.

if $$Ds < \int_{M_0}^{Mp} \{M(t)\} dt,$$

then the pressure of the inside of the casing decreases and the flow rate decreases. Expression 11

Figure 18:
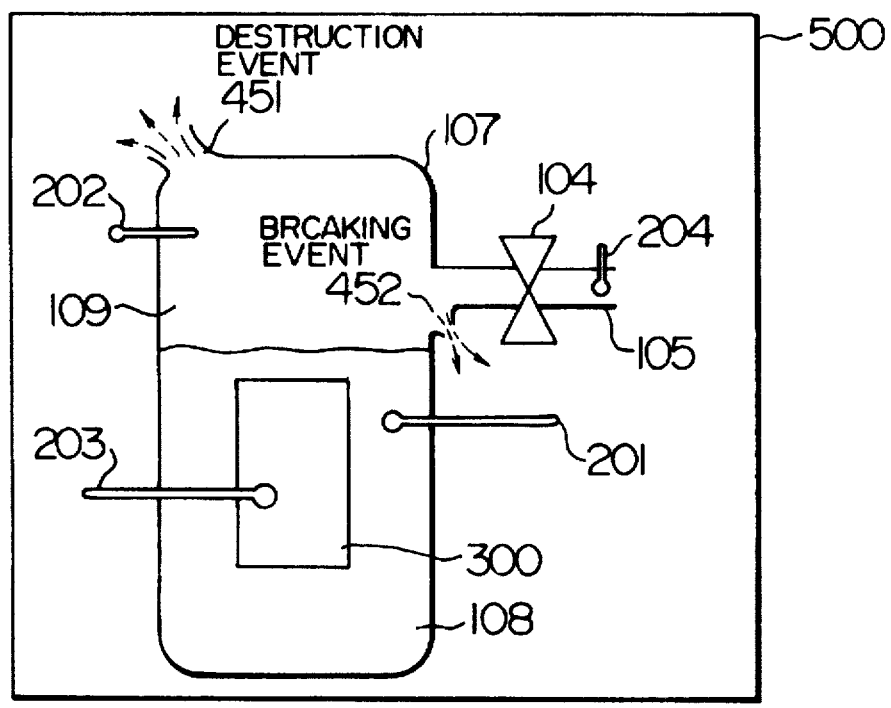
FIG. 18 is a diagram showing the case where a repercussion event is indicated in the image depicted in FIG. 16.

Then, the pressure of the inside of the casing and the flow rate after a predetermined time are measured, so that abnormality is judged on the basis of comparison with the predicted event. When, for example, the increase of the pressure of the inside of the casing and the increase of the flow rate are predicted but the measured values do not increase against the prediction, a decision is made that leaking of steam occurs in the casing. When, for example, the decrease of the pressure of the inside of the casing and the decrease of the flow rate are predicted but the measured values do not decrease against the prediction so that the waiter temperature Tw increases and the heater temperature Tm does not increase, a decision is made that the temperature sensor 203 is abnormal. FIG. 18 shows an example of image display of a repercussion event on the basis of the result of the judgment of abnormality as described above. In the drawing, in the case where a decision is made that leaking of steam occurs in the casing 107 and the increase of the pressure of the inside of the casing is not stopped so that the flow rate does not increase, a casing destruction event 451 or a nozzle breaking event 452 is inferred and the repercussion event is displayed in the form of an image.

Figure 19:
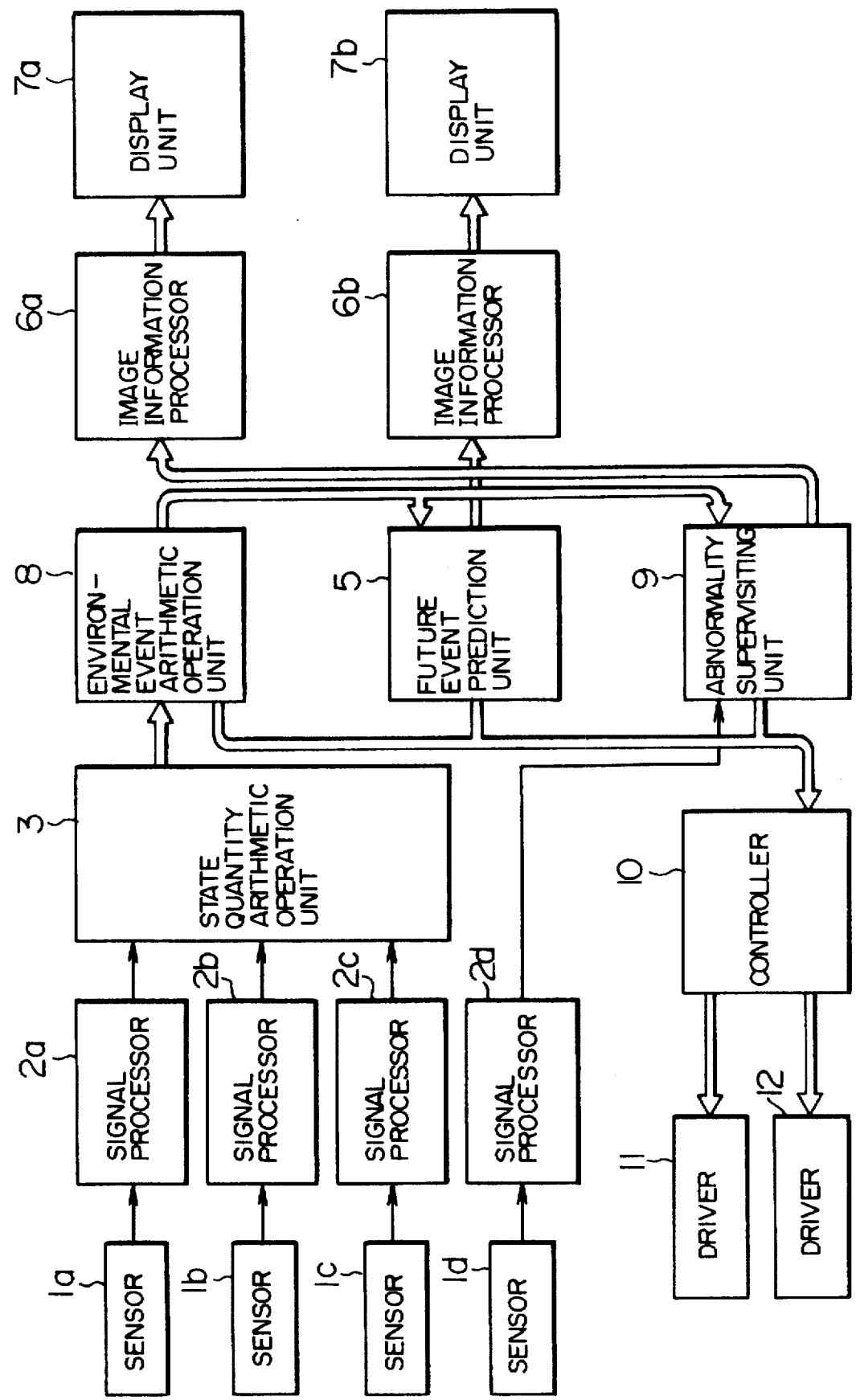
FIG. 19 is a diagram showing a sixth embodiment of the present invention adapted to a plant supervisory diagnosis system.
Figure 20:
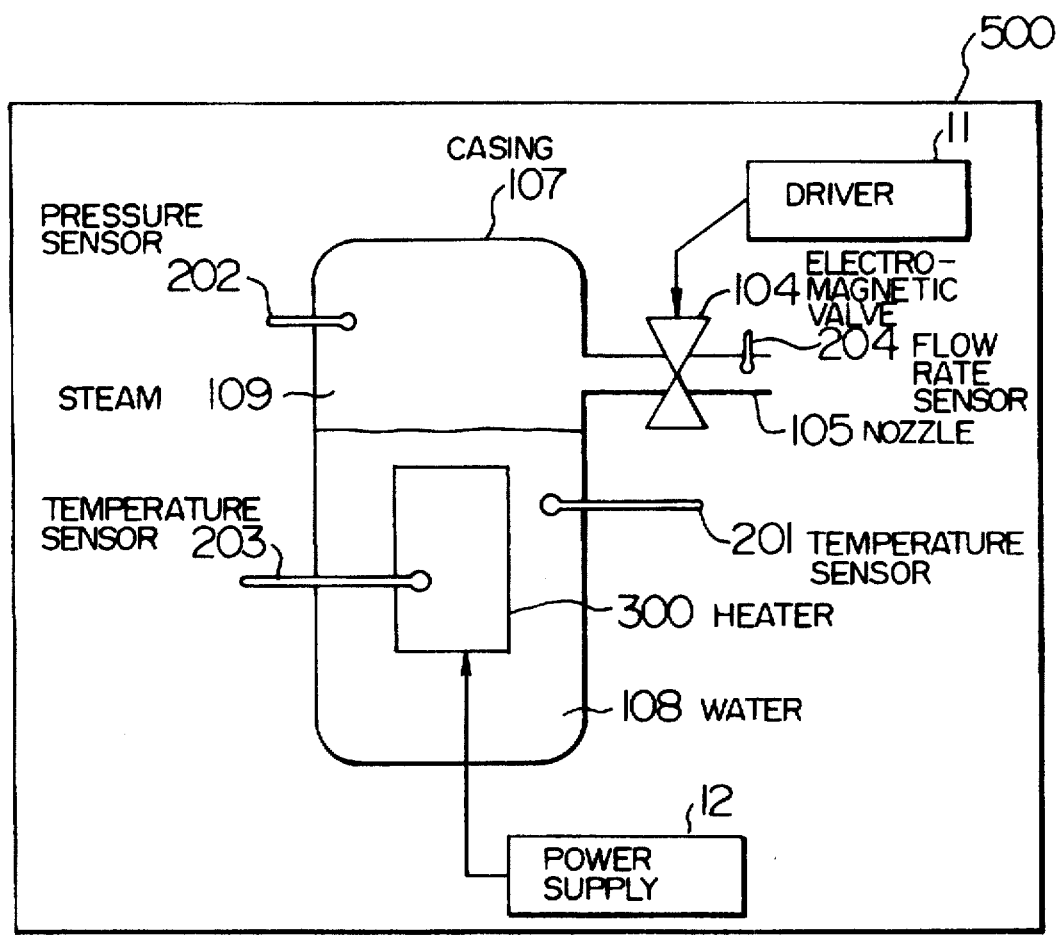
FIG. 20 is a diagram showing an example of image display in the case where the system depicted in FIG. 19 is applied to a container to be heated and boiled.

Referring to FIG. 19, a sixth embodiment of the present invention adapted to a plant supervisory diagnosis system will be described below. The structure in FIG. 19 is obtained by adding a controller 10, a driver 11 and a power supply 12 to the system depicted in FIG. 15. The case where the system in FIG. 19 is applied to a heat and boil container shown in FIG. 20 will be described below. FIG. 20 shows a structure in which a power supply 12 for supplying electric power to the heater 300 and a driver 11 for driving the electromagnetic valve 104 are added to the system structure shown in FIG. 6. The power supply 12 and the driver 11 are controlled by the controller 10. The other structure in FIG. 19 is the same as that in FIG. 15 and the description thereof will be omitted.

Assuming now that an operator operates the controller 10 to increase the quantity of electric power supplied to the heater 300 through the electric supply 12 while the electromagnetic valve 104 is kept closed, then pressure $P_0$ which is supervisory information of the pressure sensor 202 at the present point of time and temperatures $Tw_0$ and $Tm_0$ which are supervisory information of the temperature sensors 201 and 203 are predicted to increase. In the case where information against the prediction is obtained, the sensor giving the information or the heater 300 can be inferred to be abnormal. Of course, because there is no increase of pressure $P_0$ and temperature $Tw_0$ in the case where the heater 300 is abnormal, the abnormality of the heater 300 can be discriminated from the abnormality of the sensor 203 (information source of temperature $Tm_0$).

Assuming now that the operator operates the controller 10 to close the electromagnetic valve 104 through the driver 11 while the quantity of electric power supplied to the heater 300 is kept constant, then pressure $P_0$ decreases and the flow rate $M_0$ and the quantity D of generation of voids per unit time increase but the pressure $P_0$, the flow rate $M_0$ and the quantity D of generation of voids are predicted to become balanced to constant values respectively. If the flow rate $M_O$ is zero against the prediction, the electromagnetic valve 104 or the driver 11 can be judged to be abnormal or the operation of the operator can be judged to be abnormal because the electromagnetic valve 104 is kept closed. In this occasion, the controller 10 requests the operator to make a retrial so that the operator makes a retrial. If the flow rate $M_O$ is zero in spite of the retrial, a decision is made that the maloperation is not the cause but the electromagnetic valve 104 or the driver 11 is abnormal.

In the case where the changes of the pressure $P_O$, temperatures $Tw_O$ and $Tm_O$, flow rate $M_O$ and void generation quantity D are supervised after the closing operation of the electromagnetic valve 104 but all the values do not become constant after a predetermined time, a decision is made that abnormality occurs in the sensor giving information expressing an inconstant value or in a structural material of the casing. If the pressure $P_O$, temperature $Tm_O$ and flow rate $M_O$ are kept to decrease, a decision is made that the heater 300 is abnormal. If only the pressure $P_O$ decreases but the void generation quantity D is constant, a decision is made that the pressure sensor 202 is abnormal. The abnormal event thus decided is displayed in the form of an image, for example, as represented by the sensor abnormality event 450 shown in FIG. 17 or as represented by the destruction event 451 and the breaking event 452 shown in FIG. 18.

A function for making the operator confirm whether the manipulated value is proper or not before the operation will be described below. For example, in the case where the operator is to operate the electromagnetic valve 104 from an opened state to a closed state, the operator inputs an assumed manipulated value into the future event prediction unit 5 in FIG. 19 to switch the electromagnetic valve 104 from an opened state to a closed state. In the future event prediction unit 5, the pressure Pp, temperatures Twp and Tmp and void generation quantity Dp in the case where the electromagnetic valve 104 is closed are predicted on the basis of the pressure $P_O$, temperatures $Tw_O$ and $Tm_O$, flow rate $M_O$, and void generation quantity D at the present point of time. The image information processor 6b indicates a predicted quantity of state and a future event in the form of an image on the display unit 7b in accordance with the predicted values. For example, the predicted value Dp of void generation quantity is indicated in the form of an animation image as shown in FIGS. 9 to 11. For example, the predicted pressure Pp and temperatures Twp and Tmp are indicated while changed so that the display luminance or hue of the steam 109, heater 300 and water 108 is related to the pressure and temperatures as shown in FIG. 7.

Further, a future event is predicted in accordance with the expression 8 on the basis of comparison between the predicted pressure Pp and the starting pressure Pe of the electromagnetic valve 104. In the case where a judgment is made that steam leaks from the electromagnetic valve 104, the released steam 401 is indicated as shown in FIG. 8. By the aforementioned display image, not only the operator can confirm whether the manipulated value is proper or not before the operation but the operator can beforehand grasp how the plant system will be changed by the manipulation.

Figure 21:
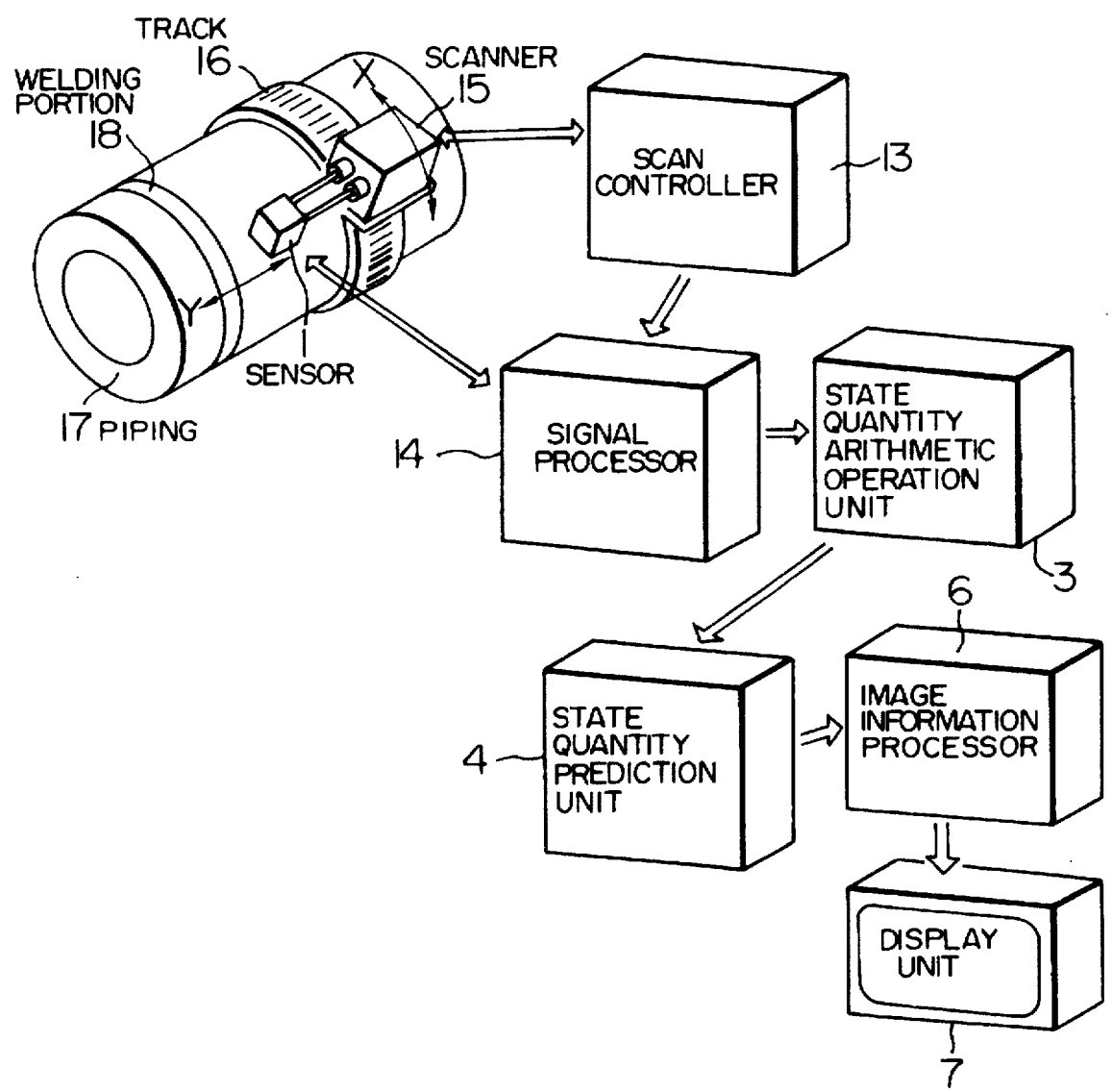
FIG. 21 is a diagram showing a seventh embodiment of the present invention adapted to a nondestructive inspection and diagnosis system.

Referring to FIG. 21, a seventh embodiment of the present invention adapted to a nondestructive inspection and diagnosis system will be described below. This system comprises a scanner 15 for scanning the sensor 1 on a surface of the piping 17 along tracks 16 and in directions perpendicular and parallel to a welding portion 18, a scan controller 13 for performing driving control of the scanner 15, a signal processor 14 for controlling transmission and reception of the sensor 1 and for processing sensor information and sensor position information given by the scan controller 13, a state quantity arithmetic operation unit 3 for calculating physical quantities such as shape, size, and so on, of a defect existent in the piping welding portion 18 on the basis of information of the signal processor 14, a state quantity prediction unit 4 for predicting the progress of the defect after a predetermined time on the basis of the physical quantities of the defect obtained by the state quantity arithmetic operation unit 3, an image information processor 6 for converting the result of the arithmetic operation into image information, and a display unit 7 for displaying an image of the defect.

Assume now the case where an ultrasonic probe is used as the sensor 1 and where ultrasonic wave thereof enters the piping welding portion 18 at an oblique angle θ with respect to the direction perpendicular to the piping welding portion 18. In this case, when the direction parallel to the piping welding portion 18, the direction perpendicular thereto and the direction of the thickness from the surface of the piping are set as X, Y and Z axes respectively and when the Z coordinate of the piping surface is set as zero, the coordinates (x, y, z) of the defect are as represented by the following expression:

$x = Xs$ $y = Ys + (v \cdot t_1 \cdot \sin \theta)/2$ $z = (v \cdot t_1 \cdot \cos \theta)/2$ \hfill Expression 12 in which Xs and Ys represent positions of scanning of the sensor, v represents sonic velocity in the piping, and $t_1$ represents the time of propagation of ultrasonic wave in the piping till the ultrasonic wave transmitted from the sensor is reflected on the defect surface and received by the sensor again. The propagation time is measured by the signal processor 14. Because in practice the ultrasonic wave diffuses and propagates, the accurate coordinates $(x_0, y_0, z_0)$ of the defect are obtained by processing the coordinates (x, y, z) of the defect obtained by the expression 12 through the state quantity arithmetic operation unit 3 as represented by the following expression.

$F\{A(x_0, y_0, z_0)\} = F\{A(x, y, z)\}/F\{H(x, y, z)\}$ \hfill Expression 13

In the expression 13, A represents a function which expresses the probability of existence so that the function takes 1 on the coordinates of presence of the detect and takes 0 on the coordinates of absence of the defect, F represents a function which expresses Fourier transformation, and H(x, y, z) represents a function which expresses the intensity of ultrasonic wave on the coordinates (x, y, z). The expression 13 shows a process which is generally called "holographic image reproducing arithmetic operation". By carrying out this process, the influence of the diffusion/propagation of ultrasonic wave is reduced so that the accurate coordinates of the defect is obtained.

Further, the lengths Lx, Ly, Lz of the defect on the X, Y and Z axes are obtained as represented by the following expression:

$Lx = X_0 \max - X_0 \min$ $Ly = y_0 \max - y_0 \min$ $Lz = Zt - z_0 \min$ \hfill Expression 14 in which Zt represents the thickness of the piping 17, $X_0 \max$ and $y_0 \max$ represent maximum values of X and Y coordinates in a range of presence of the defect, and $x_0$min, $y_0$min and $z_0$min represent minimum values of X, Y and Z coordinates in a range of presence of the defect.

In the state quantity prediction unit 4, the defect lengths Lxp, Lyp and Lzp after a predetermined time t are predicted on the basis of the lengths Lx, Ly and Lz and stress values Kx, Ky and Kz in the respective directions in accordance with the following expression:

$$Lxp=Lx+f(Lx, Ky, Kz, t)$$

$$Lyp=Ly+f(Ly, Kz, Kx, t)$$

$$Lzp=Lz+f(Lz, Kx, Ky, t)/2 \qquad \text{Expression 15}$$

in which f represents a function expressing the length of cracking propagation. An empirical formula obtained from empirical values of cracking propagation or a theoretical formula can be used as the function f. Values known from experiment or values assumed theoretically are used as the stress values Kx, Ky and Kz.

Figure 22:
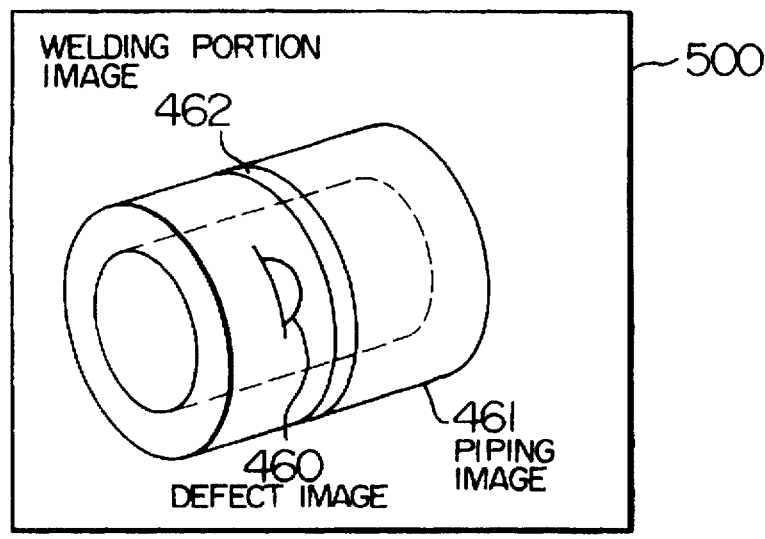
FIG. 22 is a diagram showing the case where an image of a defect is indicated on the display unit depicted in FIG. 21.
Figure 23:
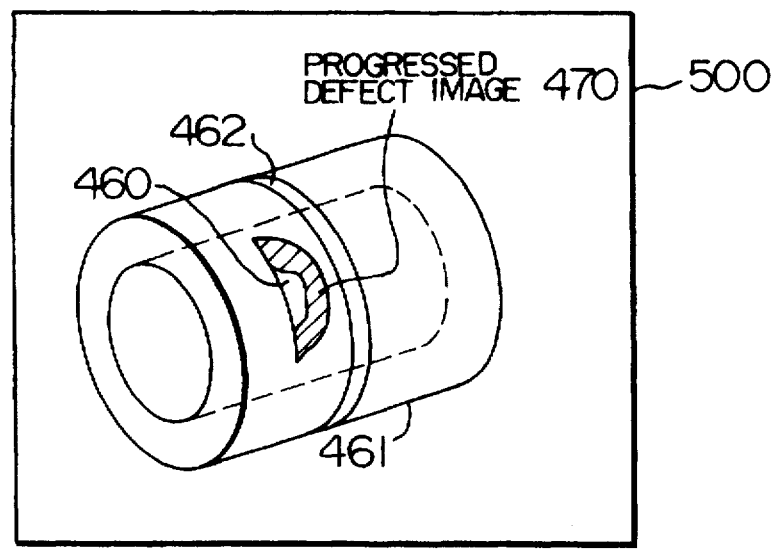
FIG. 23 is a diagram showing the case where an image of the progress of the defect is indicated on the display unit depicted in FIG. 21.

The image information processor 6 indicates an image of the defect on the display unit 7 on the basis of the predicted values Lxp, Lyp and Lzp of the defect lengths obtained from the expression 15 and the coordinates ($x_0$, $y_0$, $z_0$) of the defect. FIG. 22 shows an example of display of a defect. A defect image 460 in which it is difficult to grasp the position and shape thereof is indicated with respect to the piping image 461 and the welding portion image 462. FIG. 23 shows the case where a progressed defect image 470 is indicated with respect to the image shown in FIG. 22. In this case, both the defect image 460 and the progressed defect image 470 may be indicated or the defect image may be indicated in the form of an animation image so that the contour of the defect image moves with the contour of the defect image 460 as an initial value and with the contour of the progressed defect image 470 as a final value.

Figure 24:
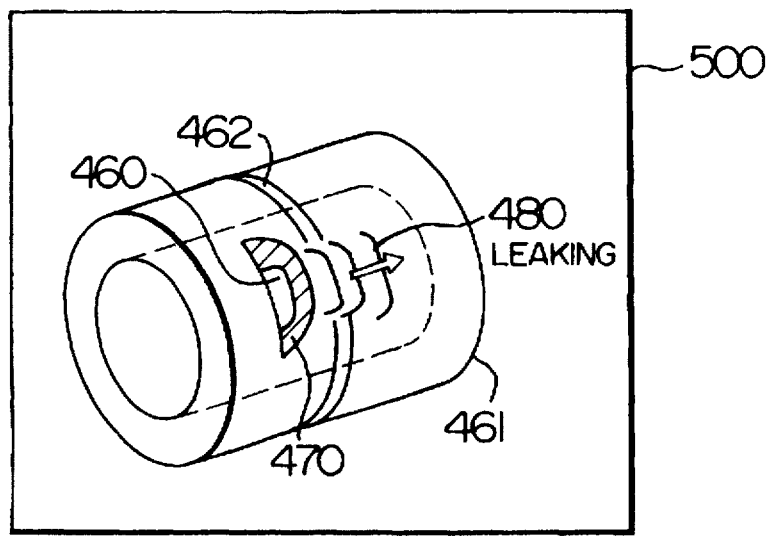
FIG. 24 is a diagram showing the case where a repercussion event caused by the progress of the defect is indicated on the display unit depicted in FIG. 21.

Further, by adding the future event prediction unit 5 to the system in FIG. 21, a repercussion event caused by the progress of the defect can be inferred on the basis of the predicted values Lxp, Lyp and Lzp of the defect lengths after a predetermined time t. That is, if Lzp≧Zt, the defect penetrates so that occurrence of leaking of fluid (such as water, steam, and so on) as passing through the inside of the piping is inferred. Further, if Lxp and Lyp are larger than predetermined values, occurrence of breaking of the piping is inferred. In the case where the penetration of the defect and the occurrence of leaking of fluid are inferred as described above, as shown in FIG. 24, an event of leaking 480 may be indicated in the form of an animation image or by character display or lamp display.

As described above, the plant supervisory diagnosis system according to the present invention can make the operator visually recognize a future event which will be caused by a transition of the current environmental state of the plant. Accordingly, the operator not having rich experience/knowledge can supervise and diagnose the environmental state of the plant and a future event easily.

Further, the plant supervisory diagnosis system according to the present invention can make the operator visually recognize a repercussion event generated newly. Accordingly, the operator not having rich experience/knowledge can supervise and diagnose the environmental state of the plant and a repercussion event easily.

Further, the plant supervisory diagnosis system according to the present invention can make the operator visually recognize both a future event which will be caused by a transition of the current environmental state of the plant and a future event which will be generated in accordance with an assumed manipulated value. Accordingly, not only can the operator supervise and diagnose the environmental state of the plant and a future event easily but the operator can take suitable measures even in the case where the operator does not have rich experience/knowledge.

Further, the nondestructive inspection and diagnosis system according to the present invention can make the inspector visually recognize the future situation of the progress of a defect. Accordingly, the inspector can recognize the importance of the defect easily.

Further, the nondestructive inspection and diagnosis system according to the present invention can make the inspector visually recognize a repercussion event which will be caused by a defect in the future. Accordingly, the inspector can recognize the importance of the defect easily.

What is claimed is:

1. A system for monitoring and diagnosing a plant state of a plant which includes a pressure vessel, comprising:

a display means for displaying a form of a present pressure vessel;

a predicting means for predicting a quantity of a state regarding temperature and pressure at a time after a predetermined time on a basis of a quantity of a fluid flow into or out of said pressure vessel and said quantity of a present state of said pressure vessel; and an inferring means for inferring an undetectable form of a deformed pressure vessel after said predetermined time on a basis of said predicted quantity of a state regarding temperature and pressure at said time after said predetermined time obtained from said predicting means; wherein said display means displays said undetectable form of the deformed pressure vessel inferred by said inferring means.

2. A system according to claim 1, wherein said display means displays said predicted quantity of a state at said time after said predetermined time.

3. A system according to claim 1, in which said predicting means predicts a change of said state regarding temperature and pressure and a change in said quantity of said fluid flow up to the predetermined time on a basis of a change of said state regarding temperature and pressure and a change of said quantity of a fluid flow up to present to predict said state regarding temperature and pressure at said time after said predetermined time.

4. A system according to claim 1, further comprising:

a means for, by using said predicted quantity of a state and said quantity of said present state, judging said quantity of a state regarding temperature and pressure of said time after said predetermined time deviated from a correlation near the quantity of said present state of temperature and pressure to be abnormal; wherein said display means displays a means for displaying a sensor, a signal system or a processing system which provides said temperature and pressure judged to be abnormal in the form of an image in distinction from said normal image.

5. A system according to claim 1, further comprising:

a means for predicting a change of said state regarding temperature and pressure in accordance with an inputted quantity of operation for the fluid flow indicative of a magnitude of output or movement of means for controlling plant operation; and a means for inferring said state of deformation of said pressure vessel on a basis of a change of said state from said means for predicting; wherein said display means displays a typical image representing said deformation inferred for said inputted quantity of operation.

6. A system according to claim 1, further comprising:

a means for predicting a change of the quantity regarding temperature and pressure for a quantity of operation provisionally inputted for the fluid flow; and a means for comparing said change of said quantity regarding temperature and pressure for the provisionally inputted quantity of operation with said quantity of temperature and pressure actually data changed in accordance with an actual quantity of temperature and pressure inputted for actual operation, and judging whether a state of any one of a sensor, a signal system and a processing system providing said actual quantity of temperature and pressure data is normal or abnormal; wherein said display means displays a result of a judged state from said means for comparing.

7. A system according to claim 1, further comprising:

said inferring means for inferring a state of leakage of a fluid out of said piping on a basis of said predicted quantity of said state; wherein said display means displays an image representing said state of leakage of a fluid out of said piping at said time after said predetermined time.

8. A system according to claim 7, wherein said display means displays said predicted quantity of said state at said time after said predetermined time as said image representing said state of leakage of a fluid out of said piping.

9. A system according to claim 7, further comprising:

means, using said predicted quantity of a state and said quantity of said present state, for judging said quantity of a state regarding temperature and pressure of said time after said predetermined time deviated from a correlation near the quantity of said present state of temperature and pressure to be abnormal; wherein said display means displays a sensor, a signal or a processing system which provides said temperature and pressure judged to be abnormal in the form of an image in distinction from a normal state.

10. A system according to claim 7, further comprising:

means for predicting a change of said state regarding temperature and pressure in accordance with an inputted quantity of operation for the fluid flow; and means for inferring said state of leakage of a fluid out of said piping on the basis of said change of state; wherein said display means displays an image representing said leakage inferred for said inputted quantity of operation.

11. A system according to claim 7, further comprising:

means for predicting a change of the quantity regarding temperature and pressure for a quantity of operation provisionally inputted for the fluid flow and;

means for comparing the change of said quantity regarding temperature and pressure for provisionally inputted quantity of operation with said quantity of said temperature and pressure actually changed in accordance with an actual operation, and judging whether a state of any one of a sensor, a signal system, and a processing system providing said actual quantity of temperature and pressure is normal or abnormal; wherein said display means displays a result of said judged state.

12. A system according to claim 7, further comprising:

compare means for comparing said quantity of a state regarding temperature and pressure predicted to occur at said time after said predetermined time and a quantity of a state regarding temperature and pressure actually obtained after said predetermined time; and judging means, when a difference of comparison made in said compare means is larger than a predetermined value, for judging that an event other than said leakage has occurred out of said piping, wherein said display means displays an image representing said event other than said leakage.

13. A system according to claim 1, further comprising:

compare means for comparing said quantity of a state regarding temperature and pressure predicted to occur at said time after said predetermined time and a quantity of a state regarding temperature and pressure actually obtained after said predetermined time; and judging means, when a difference of comparison made in said compare means is larger than a predetermined value, for judging that an event other that said deformation of said pressure vessel has occurred, wherein said display means displays an image representing said event other than said deformation of said pressure vessel.

14. A system allowing inexperienced operator monitoring and diagnosing of an operation state of a plant by using pictoral illustration of an inferred physical event of components, said system comprising:

an obtaining means for obtaining by sensors disposed within a plant, current values of environmental parameters indicative of a plant condition, on a basis of monitoring data obtained by said sensors;

a graphical means for obtaining the current values from said obtaining means, and generating current graphical display information for pictoral illustration of a physical plant component operating according to the current values;

a predicting means for predicting prediction values of said environmental parameters after a predetermined time on a basis of the current values from said obtaining means;

a graphical inference means for inferring a future physical event in an operation of said physical plant component on a basis of said prediction values of said environmental parameters from said predicting means, and generating inferred graphical display information for pictoral illustration of said physical plant component affected by the inferred said future physical event; and a display means for using said current graphical display information and said inferred graphical display information for displaying pictoral illustration of said physical plant component according to a current physical event and an inferred said future physical event for visual pictoral guidance for an inexperienced operator.

15. A system for monitoring and diagnosing a plant state of a plant which includes a pressure vessel, comprising:

a display means for displaying a form of a present pressure vessel;

a predicting means for predicting a future temperature and pressure expected within said pressure vessel at a time after a predetermined time on a basis of a quantity of a fluid flow into or out of said pressure vessel and the current temperature and pressure within said pressure vessel; and an inferring means for inferring an undetectable form of a deformed pressure vessel after said predetermined time on a basis of the predicted future temperature and pressure at said time after said predetermined time obtained from said predicting means; wherein said display means displays said undetectable form of the deformed pressure vessel after said predetermined time to pictorially aid in the monitoring and diagnosing of the plant state.

16. A system for monitoring and diagnosing a plant state of a plant which includes a pressure vessel, comprising:

a display means for displaying an image illustrating a present form of said pressure vessel;

a predicting means for predicting a quantity of a state regarding temperature and pressure at a time after a predetermined time on a basis of quantity of a fluid flow into or out of said pressure vessel and said quantity of a present state of said pressure vessel; and an inferring means for inferring an image illustrating a deformed pressure vessel after said predetermined time on a basis of said predicted quantity of a state regarding temperature and pressure at said time after said predetermined time obtained from said predicting means; wherein said display means displays said image of said deformed pressure vessel inferred by said inferring means, for visual pictoral guidance for an inexperienced operator.

17. A system for monitoring and diagnosing a plant state of a plant which includes a pressure vessel, comprising:

a display means for displaying an image illustrating a present form of said pressure vessel;

a predicting means for predicting a future temperature and pressure expected within said pressure vessel at a time after a predetermined time on a basis of a quantity of a fluid flow into or out of said pressure vessel and the current temperature and pressure within said pressure vessel; and an inferring means for inferring an image illustrating a deformed pressure vessel after said predetermined time on a basis of the predicted future temperature and pressure at said time after said predetermined time obtained from said predicting means; wherein said display means displays said image of said deformed pressure vessel inferred by said inferring means after said predetermined time to pictorially aid in the monitoring and diagnosing of the plant state.

* * * * *